(12) United States Patent
Takahashi

(10) Patent No.: US 6,560,181 B1
(45) Date of Patent: May 6, 2003

(54) INFORMATION RECORDING MEDIUM WHICH RECORDS INFORMATION THAT PERTAINS TO INTEGRITY

(75) Inventor: Hideki Takahashi, Kashiwa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 275 days.

(21) Appl. No.: 09/705,769

(22) Filed: Nov. 6, 2000

(30) Foreign Application Priority Data

Nov. 9, 1999 (JP) .......................................... 11-318821

(51) Int. Cl.$^7$ ................................................. G11B 3/90
(52) U.S. Cl. ................... 369/53.35; 369/53.36; 369/124.07; 369/275.3
(58) Field of Search .......................... 369/47.14, 47.15, 369/47.17, 47.18, 47.35, 53.12, 53.15, 53.2, 53.31, 53.32, 53.33, 53.35, 53.36, 53.44, 275.3, 124.07, 124.08; 714/699

(56) References Cited

U.S. PATENT DOCUMENTS

| | | | | |
|---|---|---|---|---|
| 4,849,975 A | * | 7/1989 | Patel ........................... | 714/761 |
| 5,646,923 A | * | 7/1997 | Shea ......................... | 369/53.17 |
| 6,219,814 B1 | * | 4/2001 | Coker et al. ................. | 714/769 |
| 6,367,047 B1 | * | 4/2002 | McAuliffe et al. ........... | 714/769 |

FOREIGN PATENT DOCUMENTS

JP 61-71464 4/1986

* cited by examiner

*Primary Examiner*—Paul W. Huber
(74) *Attorney, Agent, or Firm*—Oblon, Spivak, McClelland, Maier & Neustadt, P.C.

(57) ABSTRACT

An information recording medium of this invention has a plurality of sector fields that record data, and each sector field has an identification information area (recording type area). The identification information area records one of first identification information indicating that data recorded in the sector field has high integrity, and second identification information indicating that data has low integrity.

18 Claims, 7 Drawing Sheets

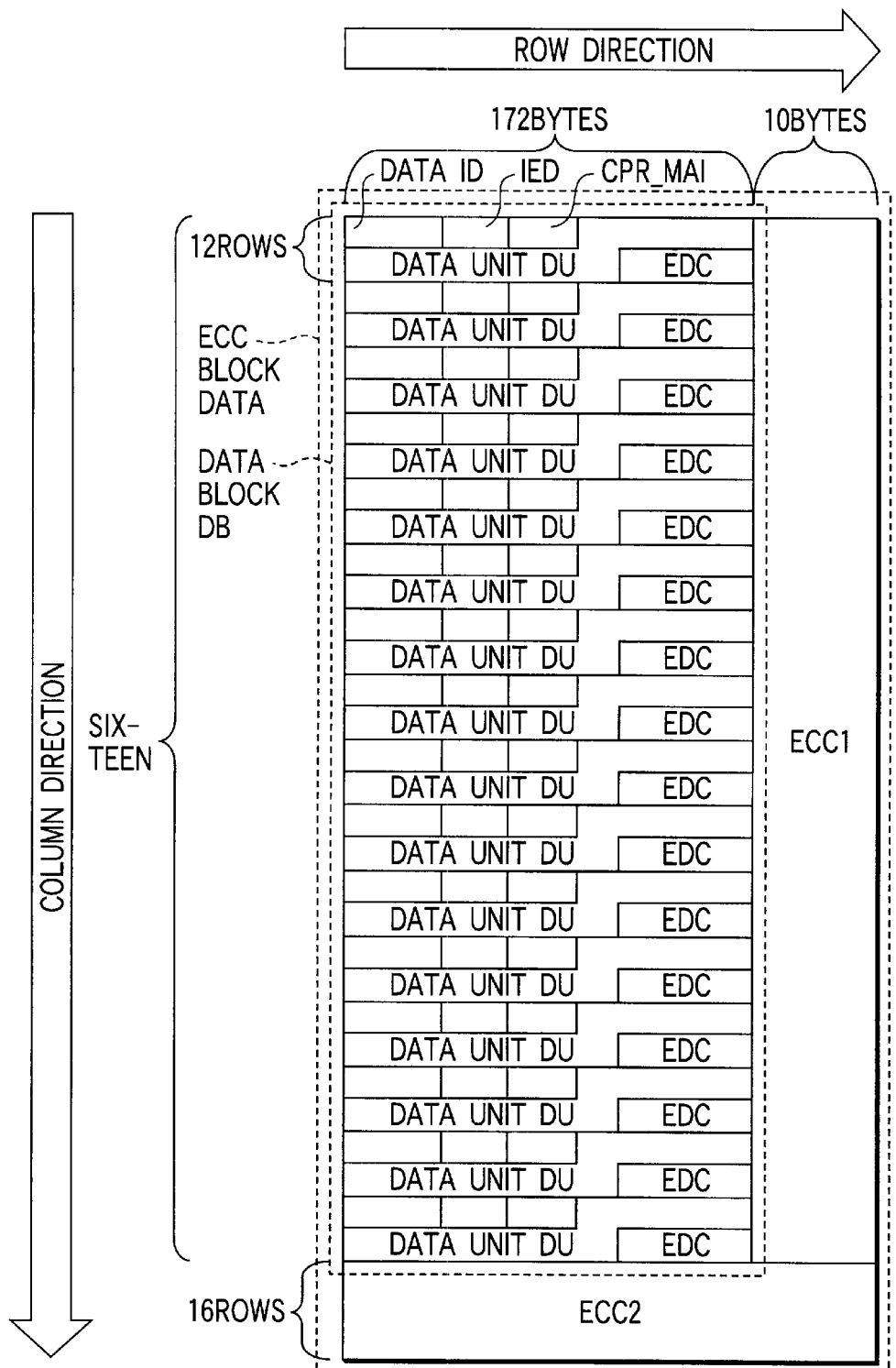
F I G. 2

|  | METHOD EXAMPLE | FEATURE |
|---|---|---|
| HIGH-INTEGRITY WRITE | WRITE WITH VERIFY | • HIGH INTEGRITY OF DATA AFTER WRITE<br>• LONG PROCESSING TIME<br>• EXAMPLE OF PURPOSE: PC RECORDING, ETC. |
| LOW-INTEGRITY WRITE | WRITE WITHOUT VERIFY<br>WRITE WITHOUT REPLACEMENT | • LOW INTEGRITY OF DATA AFTER WRITE<br>• SHORT PROCESSING TIME<br>• EXAMPLE OF PURPOSE: AV RECORDING, ETC. |

FIG. 10

| WRITE METHOD (COMMAND FROM HOST) | | ORIGINAL STATE OF TARGET BLOCK | |
|---|---|---|---|
| | | INTEGRITY BIT 0 (LOW INTEGRITY) | INTEGRITY BIT 1 (HIGH INTEGRITY) |
| READ-MODIFY-WRITE | HIGH-INTEGRITY WRITE | RECORD IN HIGH-INTEGRITY RECORDING MODE INTEGRITY BIT 1 (HIGH INTEGRITY) | RECORD IN HIGH-INTEGRITY RECORDING MODE INTEGRITY BIT 1 (HIGH INTEGRITY) |
| | LOW-INTEGRITY WRITE | RECORD IN LOW-INTEGRITY RECORDING MODE INTEGRITY BIT 0 (LOW INTEGRITY) | RECORD IN HIGH-INTEGRITY RECORDING MODE INTEGRITY BIT 1 (HIGH INTEGRITY) |
| BLOCK WRITE | HIGH-INTEGRITY WRITE | RECORD IN HIGH-INTEGRITY RECORDING MODE<br>INTEGRITY BIT 1 (HIGH INTEGRITY) | |
| | LOW-INTEGRITY WRITE | RECORD IN LOW-INTEGRITY RECORDING MODE<br>INTEGRITY BIT 0 (LOW INTEGRITY) | |

FIG. 11

INFORMATION RECORDING MEDIUM WHICH RECORDS INFORMATION THAT PERTAINS TO INTEGRITY

CROSS-REFERENCE TO RELATED APPLICATIONS

This application is based upon and claims the benefit of priority from the prior Japanese Patent Application No. 11-318821, filed Nov. 9, 1999, the entire contents of which are incorporated herein by reference.

BACKGROUND OF THE INVENTION

The present invention relates to an information recording medium which has a plurality of sector fields that record data, and in which a block is defined by a set of a predetermined number of sector fields, for example, a DVD (Digital Versatile Disk). The present invention also relates to an information recording apparatus and method for recording information on the information recording medium. Furthermore, the present invention relates to an information reproduction apparatus and method for reproducing information from the information recording medium.

In recent years, information recording media such as a DVD that features high-density recording have been extensively studied and developed. Such information recording medium has a plurality of sector fields which record data, and an ECC (Error Correction Code) block is defined by a set of a predetermined number of sector fields.

Even when data is recorded on some sector fields of such information recording medium, the entire ECC block which includes target sector fields as a recording destination is read. Of the read ECC block data, target data patches a portion corresponding to the target sector fields, and the ECC block is re-arranged and recorded in the original ECC block. Such recording in units of sector fields is called read-modify-write.

Such read-modify-write is suitable for recording PC data that does not require real-time processes but is not suitable for recording AV data that places an importance on real-time processes since it is relatively time-consuming. In order to avoid read-modify-write, data can be recorded in units of ECC blocks.

Upon recording AV data, in general, initial defect management that registers initial defects by format and certify is not made. That is, defects remain on the recording space. Upon recording AV data, it is important to continue recording without any interruption ignoring some errors (defects) in sector fields as a recording destination.

However, when both PC and AV data are recorded on a single information recording medium, especially, when PC data is overwritten on AV data, the error rate increases upon read-modify-write due to the absence of defect management. That is, ECC block data cannot be read out upon read-modify-write, that ECC block consequently cannot undergo a replacement process, and read-modify-write terminates abnormally.

BRIEF SUMMARY OF THE INVENTION

The present invention has been made to solve the aforementioned problems, and has as its object to provide the following information recording medium, information recording apparatus, information recording method, information reproduction apparatus, and information reproduction method:

(1) an information recording medium which can reduce the error rate upon read-modify-write when data is overwritten in units of sector fields on data recorded in units of ECC block data;

(2) an information recording apparatus and method which can reduce the error rate upon read-modify-write when data is overwritten in units of sector fields on data recorded in units of ECC block data; and (3) an information reproduction apparatus and method which can reduce the error rate upon read-modify-write when data is overwritten in units of sector fields on data recorded in units of ECC block data.

In order to solve the above problems and to achieve the above object, the information recording medium, information recording apparatus, information recording method, information reproduction apparatus, and information reproduction method according to the present invention have the following arrangements.

(1) An information recording medium of the present invention is an information recording medium which has a plurality of sector fields that record data, and in which a block is defined by a set of a predetermined of sector fields, wherein each sector field has an identification information area for storing one of first identification information indicating that data is recorded with a first integrity level, and second identification information indicating that data is recorded with a second integrity level lower than the first integrity level.

(2) An information recording apparatus of the present invention is an information recording apparatus for recording information on an information recording medium which has a plurality of sector fields that record data and respectively have identification information areas, and in which a block is defined by a set of a predetermined of sector fields, comprising:

recording means for recording, in the identification information area, first identification information indicating that data is recorded with a first integrity level when desired information is recorded with the first integrity level on the information recording medium, and recording, in the identification information area, second identification information indicating that data is recorded with a second integrity level when desired information is recorded with the second integrity level on the information recording medium.

(3) An information recording method of the present invention comprises:

the step of, when desired information is recorded with a first integrity level in an information recording medium which has a plurality of sector fields that record data and respectively have identification information areas, and in which a block is defined by a set of a predetermined of sector fields, recording data in each identification information area with the first integrity level; and the step of, when desired information is recorded with a second integrity level in the information recording medium, recording data in each identification information area with the second integrity level.

(4) An information reproduction apparatus of the present invention is an information reproduction apparatus for reproducing information from an information recording medium which has a plurality of sector fields that record data, and in which each sector field has an identification information area that records one of first identification information indicating that data is recorded with a first integrity level, and second identification information indicating that data is recorded with a second integrity level lower than the first integrity level, and a block is defined by a set of a predetermined number of sector fields, comprising:

reproduction means for acquiring information that pertains to integrity by reproducing the first identification information or second identification information from the identification information area.

(5) An information reproduction method of the present invention is an information reproduction method for reproducing information from an information recording medium which has a plurality of sector fields that record data, and in which each sector field has an identification information area that records one of first identification information indicating that data is recorded with a first integrity level, and second identification information indicating that data is recorded with a second integrity level lower than the first integrity level, and a block is defined by a set of a predetermined number of sector fields, comprising:

the step of acquiring information that pertains to integrity by reproducing the first identification information or second identification information from the identification information area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a schematic view showing the structure of ECC block data recorded on the optical disk shown in FIG. 1;

FIG. 10 shows a list of items that pertain to data having first and second integrity levels; and FIG. 11 shows the relationship between the integrity level of data to be recorded and an integrity bit of a block as a recording destination.

DETAILED DESCRIPTION OF THE INVENTION

A preferred embodiment of the present invention will be described hereinafter with reference to the accompanying drawings.

An example of an optical disk (DVD-RAM disk) as an information recording medium according to the present invention will be explained first with reference to FIG. 1.

Figure 1:
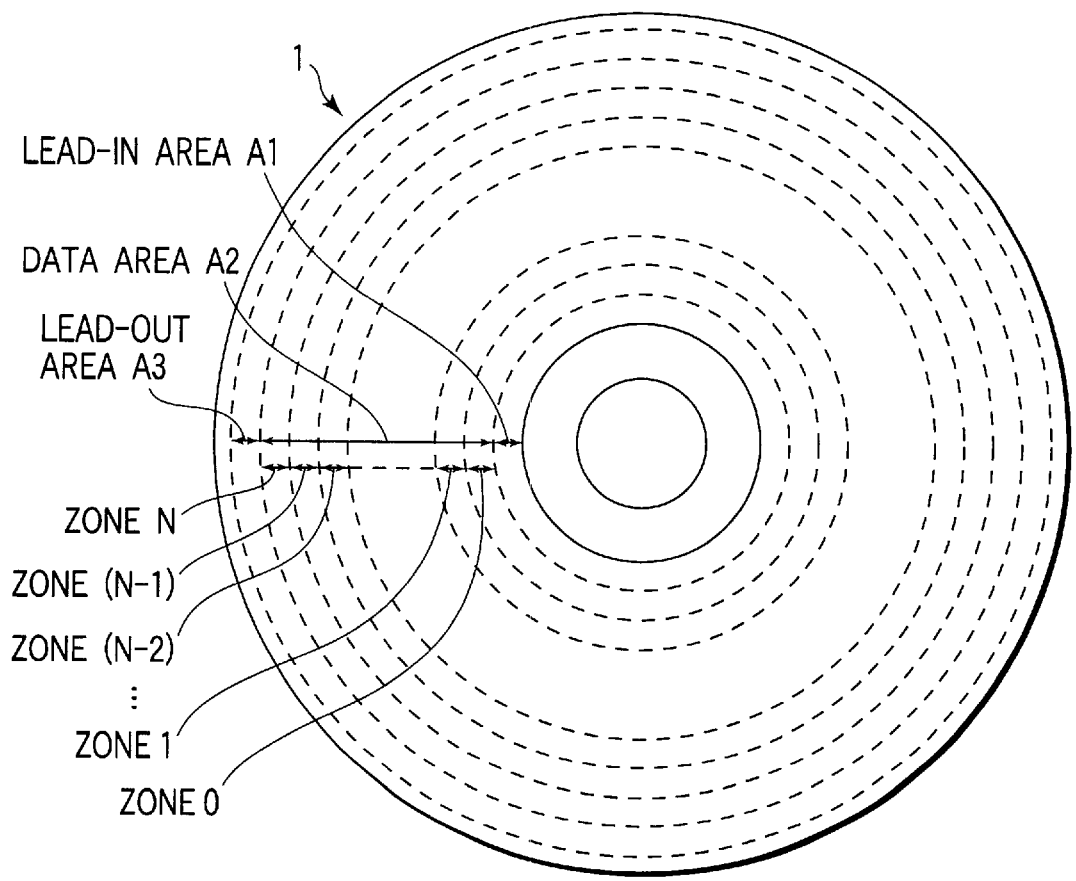
FIG. 1 is a plan view showing the layout of a lead-in area, data area, lead-out area, and the like on an optical disk.

FIG. 1 shows the layout of a lead-in area, data area, lead-out area, and the like on an optical disk.

As shown in FIG. 1, an optical disk 1 has a lead-in area A1, data area A2, and lead-out area A3 in turn from the inner periphery side. The lead-in area A1 includes an emboss data zone, mirror zone (non-recording zone), and rewritable data zone. The data area A2 includes a rewritable data zone which is made up of a plurality of zones, i.e., zones 0 to N. The lead-out area A3 includes a rewritable data zone.

The emboss data zone of the lead-in area A1 records reference signal and control data as an emboss pattern in the manufacture of the optical disk 1. The rewritable data zone of the lead-in area A1 records identification data indicating the type of disk, defect management data for managing a defective area, and the like. Note that the area where the defect management data is recorded will be referred to as a DMA (Defect Management Area) hereinafter. The rewritable data zone of the lead-out area A3 records the same data as those recorded on the rewritable data zone of the lead-in area A1.

The emboss data zone assured on the lead-in area A1 is comprised of a plurality of tracks, and each track is made up of a plurality of sector fields. This zone is processed at a predetermined rotational speed.

Zone 0 in the rewritable data zones assured on the lead-in area A1 and data area A2 consists of X tracks, each of which is made up of Y sector fields. This zone is processed at rotational speed Z0 (Hz).

Zone 1 of the rewritable data zone assured on the data area A2 consists of X tracks, each of which is made up of (Y+1) sector fields. This zone is processed at rotational speed Z1 (Hz) (Z0>Z1).

Zone 2 of the rewritable data zone assured on the data area A2 consists of X tracks, each of which is made up of (Y+2) sector fields. This zone is processed at rotational speed Z2 (Hz) (Z1>Z2).

Each of zones 3 to N of the rewritable data zone assured on the data area A2 consists of x tracks. Each track of zone 3 is made up of (Y+3) sector fields, and each track of zone 4 is made up of (Y+4) sector fields. That is, each track of zone N is made up of (Y+N) sector fields. Zone 3 is processed at rotational speed Z3 (Hz) (Z2>Z3), and zone 4 is processed at rotational speed Z4 (Hz) (Z3>Z4). That is, zone N is processed at rotational speed ZN (Hz) (Z(N−1)>ZN).

The rewritable data zone assured on the lead-out area A3 consists of a plurality of tracks, each of which is made up of (Y+N) sector fields. This zone is processed at rotational speed ZN (Hz).

As mentioned above, the number of sector fields per track increases and the rotational speed lowers accordingly in turn from zones on the inner periphery side of the optical disk 1. That is, the optical disk 1 is controlled by a ZCLV (Zone Constant Linear Velocity) scheme.

Figure 3:
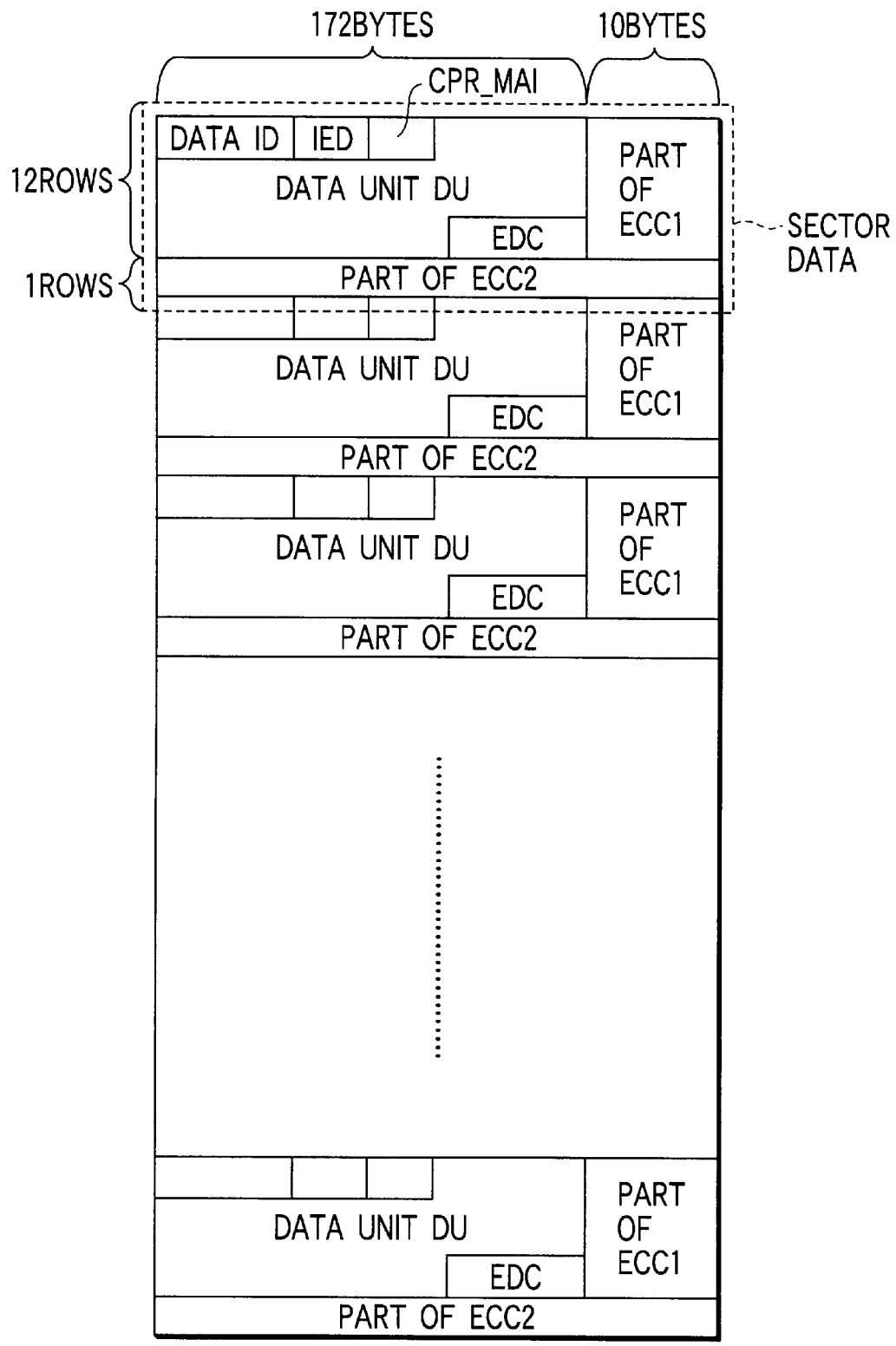
FIG. 3 is a schematic view showing the data structure of sector data generated from the ECC block data shown in FIG. 2.

The structures of data recorded on and reproduced from a DVD-RAM will be explained below with reference to FIGS. 2 and 3. FIG. 2 schematically shows the structure of ECC block data. FIG. 3 schematically shows the data structure of sector data recorded on a recording field.

On each zone of the DVD-RAM, tracks that record data are formed, and a plurality of sector fields which records data of a predetermined unit are formed on each track. One sector field contains a header field and recording field. The header field records in advance data such as addresses and the like as an emboss pattern data, and the recording field records user data by phase change recording. Also, the DVD-RAM records data in a format called ECC block data. Strictly speaking, 16 sector data generated from the ECC block data are distributed and recorded in 16 sector fields. More specifically, one sector data is recorded on the recording field of one sector field.

As shown in FIG. 2, the ECC block data is comprised of a data block (DB) containing user data, horizontal error correction code (ECC1) and vertical error correction code (ECC2).

The DB is made up of data which line up along predetermined numbers of rows and columns, and can be broken up into 16 data units (DU). More specifically, the DB consists of 172 (bytes)×12 (rows that form the DU)×16 (DUs that form the DB) data. Each DU is made up of 172 (bytes)×12 (rows that form the DU) data, and includes 4-byte data ID, 2-byte data ID error detection code (IED), CPR_MAI, 2,048-byte user data, error detection code (EDC), and the like. The data ID is used to scramble the user data included in the DU. The IED detects any error in a total of 6 bytes including the data ID and this IED. The EDC is used to detect any error included in a group of some data in the DU.

The ECC1 is used to correct any errors included in data in the DB in the row direction (horizontal direction). More specifically, the ECC1 is made up of 10 (bytes)×12 (rows that form the DU)×16 (DUs that form the DB) data.

The ECC2 is used to correct any errors included in data in the DB in the column direction (vertical direction). More specifically, the ECC2 is made up of {172 (bytes)+10 (bytes)}×16 (DUs that form the DB) data.

Subsequently, sector data will be described below with reference to FIG. 3.

Sixteen sector data are generated from one ECC block data. One sector data is made up of a DU and some data of the ECC1 and ECC2 assigned to that DU. More specifically, each sector data is made up of {172 (bytes)+10 (bytes)}×12 (rows that form the DU)+1 (one row of the ECC2) data.

Note that the data ID and IED contained in the DU of the ECC block data can be independently read out even when error correction cannot be done using the ECC1 and ECC2.

Figure 4:
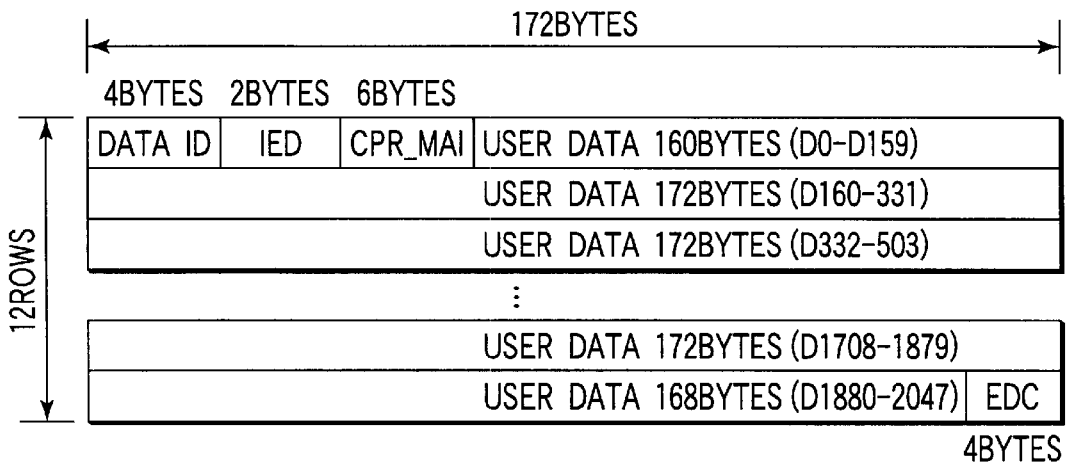
FIG. 4 is a schematic view showing the data structure of a data unit contained in the sector data shown in FIG. 3.

The DU will be explained below with reference to FIG. 4.

As described above, the DU is made of 172 (bytes)×12 (rows that form the DU) data, and includes the data ID, IED, CPR_MAI, 2,048-byte user data, EDC, and the like. More specifically, the start row, i.e., the first row includes 4-byte data ID, 2-byte IED, 6-byte CPR_MAI, and 160-byte user data. Each of the second to 11th rows includes 172-byte user data. The last row, i.e., the 12th row includes 168-byte user data and 4-byte EDC.

The data ID will be explained below with reference to FIG. 5A.

The data ID includes data such as 1-byte sector information, 3-byte data field number, and the like. The sector information includes data such as 1-bit sector format type, 1-bit tracking method, 1-bit reflectivity, 1-bit integrity flag, 2-bit area type, 1-bit data type, 1-bit layer number, and the like. An area where the integrity flag is recorded will be referred to as an integrity flag area hereinafter.

In the sector format type, bit 0 indicates a CLV format, and bit 1 a zone format. In the tracking method, bit 0 indicates a pit, and bit 1 a groove. In the reflectivity, bit 0 indicates less than 40%, and bit 1 40% or higher. In the integrity flag area, bit 1 (first identification information) indicates a first integrity level (high integrity), and bit 0 (second identification information) a second integrity level (low integrity) lower than the first integrity level. In the type area, bit 00 indicates data, bit 01 lead-in, bit 10 lead-out, and bit 11 middle. In the layer number, bit 0 indicates layer 0, and bit 1 layer 1.

Figure 5A:
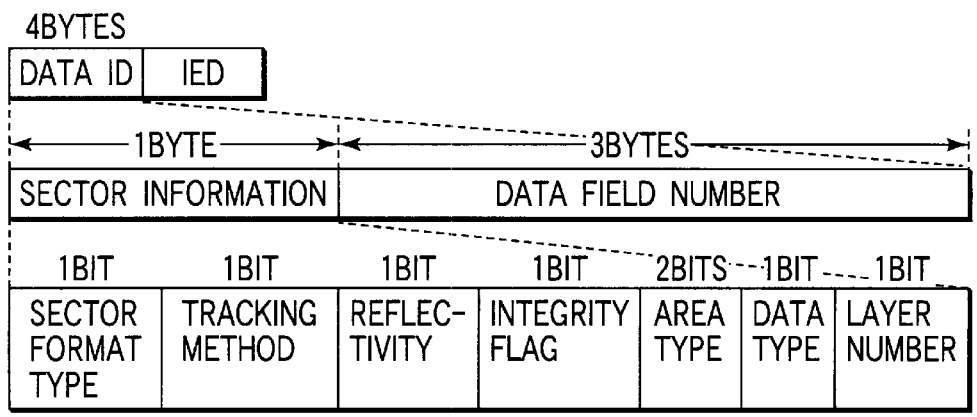
FIGS. 5A and 5B are schematic views showing the data structure of the data ID contained in the data unit shown in FIG. 4.
Figure 5B:
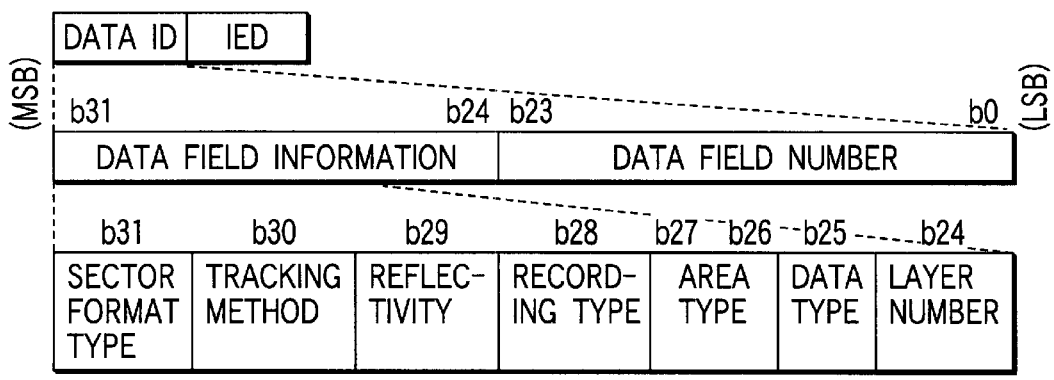

Alternatively, the structure of the data ID can be expressed, as shown in FIG. 5B. That is, the data ID includes data such as 1-byte data field information, 3-byte data field number, and the like. Furthermore, the data field information includes data such as 1-bit sector format type, 1-bit tracking method, 1-bit reflectivity, 1-bit recording type, 2-bit area type, 1-bit data type, 1-bit layer number, and the like. An area where the recording type is recorded will be referred to as a recording type area hereinafter.

In the recording type area, bit 0 (first identification information) indicates first integrity level (high integrity), and bit 1 (second identification information) second integrity level (low integrity) lower than the first integrity level.

That is, bit 1 may indicate the first integrity level and bit 0 may indicate the second integrity level, as shown in FIG. 5A, or bit 0 may indicate the first integrity level and bit 1 may indicate the second integrity level, as shown in FIG. 5B. That is, the integrity flag shown in FIG. 5A corresponds to the recording type shown in FIG. 5B, although they have different expressions (the roles of bits 1 and 0 are reversed).

Data recorded with the first integrity level is called General data, and data recorded with the second integrity level is called Real-time-data. General data includes, for example, PC data. Real-time-data includes, for example, AV data. General data and Real-time-data are defined as follows.

General data: Linear replacement algorithm is applied to a Block containing the corresponding sector if the Block is defective.

Real-time data: Linear replacement algorithm is not applied to a Block containing the corresponding sector even if the Block is defective.

The Linear replacement algorithm will be briefly explained below. The Linear replacement algorithm is applied upon recording, e.g., PC data. When target data is recorded in a given target block, the recorded data is read out from that target block, and it is confirmed if the target data is accurately recorded. As a result of this confirmation, if it is determined that the target block is defective and data cannot be accurately recorded in the target block, recording in the target block is canceled. Instead, the target data is recorded in a predetermined block in another area prepared in advance, i.e., so-called replacement area. That is, data to be recorded in the target block is recorded in the predetermined block in the replacement area. Such replacement process is the Linear replacement algorithm.

When the linear replacement algorithm is applied to a defective Block during write operation, Recording type bit of all the sectors within all Blocks to be written to shall be set to 0b. When Streaming data is written to a Block, a defect management scheme other than the linear replacement algorithm is applied and all the sectors within the Block shall be written with Recording type bit of 1b. When writing some sectors of a Block, and if the Block is uncorrectable before writing and the previously recorded Recording Type bits in the Block are recognized as 1b, then the partially corrected data or padding data of 0b for all bits may be used for the writing data of the other sectors of the Block. A Block with Recording type of 1b shall not be replaced, even if the Block to be read is found to be defective.

The aforementioned integrity flag will be explained in detail below. Note that the integrity flag is substantially the same as the recording type, as described above. Therefore, the following description can be interpreted as that of the recording type by reading bit 1 as bit 0, and vice versa.

When bit 1 is recorded as the integrity flag in the integrity flag area, a sector field including this integrity flag is included in a block recorded with the first integrity level. For example, assume that data recorded with verify has the first integrity level, as shown in FIG. 10. Such data with verify has high integrity after recording but requires a long recording time. The data recorded with verify includes PC data or the like. When data is recorded with verify, bit 1 as the integrity flag is recorded in a sector field as the recording destination, and in sector fields which form a block to which that sector block belongs.

Conversely, when bit 0 is recorded as the integrity flag in the integrity flag area, a sector field including this integrity flag is included in a block recorded with the second integrity level. For example, assume that data recorded without verify and data without replacement have the second integrity level, as shown in FIG. 10. Such data recorded without verify and without replacement have low integrity after recording but require only a short recording time. The data recorded without verify and without replacement include, e.g., AV data and the like. When data is recorded without verify or without replacement, bit 0 as the integrity flag is recorded in a sector field as the recording destination, and in sector fields which form a block to which that sector block belongs.

FIG. 11 shows the relationship between the integrity level of data to be recorded and the integrity bit in a block as a recording destination. The relationship between the integrity level of data to be recorded and the integrity bit in a block as a recording destination will be explained below with reference to FIG. 11.

A case will be explained below wherein data is recorded by block write, i.e., in units of blocks.

When a host apparatus 3 instructs a disk drive 2 to make block write in a high integrity mode, the disk drive 2 records data in a target block as a recording destination in the high integrity mode. At this time, bit 1 is recorded as the integrity flag in sector fields that form the target block as the recording destination.

When the host apparatus 3 instructs the disk drive 2 to make block write in a low integrity mode, the disk drive 2 records data in a target block as a recording destination in the low integrity mode. At this time, bit 0 is recorded as the integrity flag in sector fields that form the target block as the recording destination.

A case will be explained below wherein data is recorded by read-modify-write, i.e., in units of sector fields.

In case of read-modify-write, four cases shown in FIGS. 11 are assumed. In the first case, the target block as a recording destination is a low-integrity block, and the recording mode is the high-integrity recording mode. In the second case, the target block as a recording destination is a high-integrity block, and the recording mode is also the high-integrity recording mode. In the third case, the target block as a recording destination is a low-integrity block, and the recording mode is also the low-integrity recording mode. In the fourth case, the target block as a recording destination is a high-integrity block, and the recording mode is the low-integrity recording mode. The high-integrity block is a block defined by a set of a predetermined number of sector fields recorded with bit 1 as the integrity flag. Conversely, the low-integrity block is a block defined by a set of a predetermined number of sector fields recorded with bit 0 as the integrity flag.

In case of read-modify-write, the disk drive 2 often executes a recording mode different from that which is instructed from the host apparatus 3 to the disk drive 2, depending on the integrity bit of the target block as the recording destination. More specifically, this is the fourth case.

In the fourth case, the host apparatus 3 instructs the disk drive 2 to execute the low-integrity recording mode (e.g., write command without verify), but the disk drive 2 executes the high-integrity recording mode (e.g., verify is done after write). In this manner, bit 1 is recorded as the integrity flag in respective sector fields included in a target block as a recording destination, and high integrity of data in that target block is maintained (the first integrity level is maintained).

In the first case, when the host apparatus 3 instructs the disk drive 2 to execute the high-integrity recording mode, the disk drive continues to execute the high-integrity recording mode. As a result, bit 1 is recorded as the integrity flag in respective sector fields included in a target block as a recording destination, and the integrity of data in this target block is changed (from the first integrity level to the second integrity level).

In the second case, when the host apparatus 3 instructs the disk drive 2 to execute the high-integrity recording mode, the disk drive continues to execute the high-integrity recording mode. As a result, bit 1 is recorded as the integrity flag in respective sector fields included in a target block as a recording destination, and high integrity of data in that target block is maintained (the first integrity level is maintained).

In the third case, when the host apparatus 3 instructs the disk drive 2 to execute the low-integrity recording mode, the disk drive continues to execute the low-integrity recording mode. As a result, bit 0 is recorded as the integrity flag in respective sector fields included in a target block as a recording destination, and low integrity of data in that target block is maintained (the second integrity level is maintained).

Whether data recorded in a given sector field has high or low integrity can be determined by looking up the integrity flag in that sector field. This integrity flag can be independently read out since it is included in the data ID, even when error correction using the ECC1 and ECC2 is disabled. Furthermore, since the integrity flag is included in the data ID, data integrity can be checked by the IED.

When a certain block is read out, it is indispensable to make error correction using an error correction code in that block. In other words, a block which cannot undergo error correction cannot be read out. However, as described above, the integrity flag can be independently read out from a block. That is, even from a block that cannot be read out, integrity bits recorded in sector fields which form this block can be read out. Whether even a block that cannot be read out is high- or low-integrity block can be determined by reading out the integrity flags recorded in the sector fields of the block that cannot be read out.

In the first and third cases, when the target block as the recording destination cannot be read out, target data is recorded in a target sector field included in the target block as the recording destination, and dummy data is recorded in other sector fields to re-generate ECC block data, thus executing recording. That is, even when a low-integrity block cannot be read out, read-modify-write can be made.

In the second and fourth cases, when a target block as a recording destination cannot be read out, a system error occurs.

A schematic arrangement of an optical disk recording/reproduction system that records various data on the aforementioned DVD-RAM and reproduces various data recorded on the DVD-RAM will be explained below with reference to FIG. 6. Various data include the aforementioned integrity flag, dummy data, and the like. The optical disk recording/reproduction system to be described below records the integrity flag and dummy data on the optical disk, and reproduces the integrity flag recorded on the optical disk, as described above.

Figure 6:
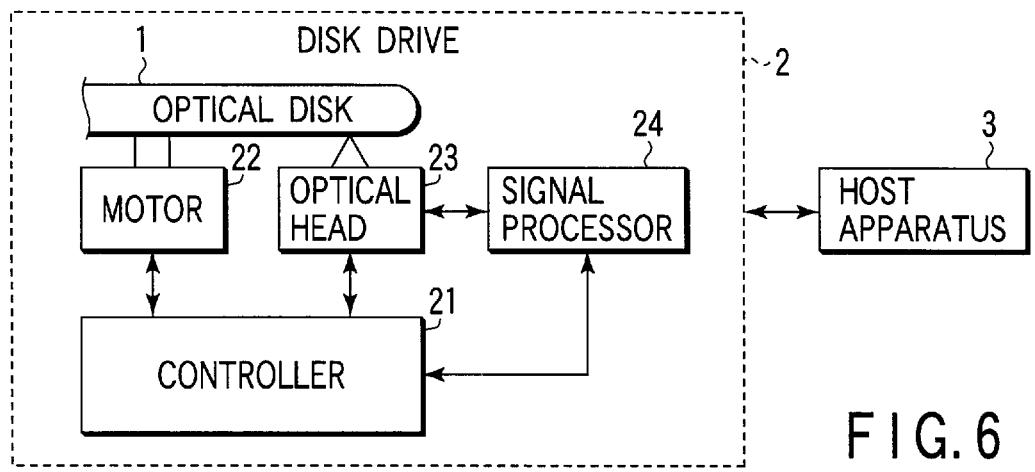
FIG. 6 is a schematic block diagram showing the arrangement of an optical disk recording/reproduction system according to the present invention.

As shown in FIG. 6, the optical disk recording/reproduction system comprises a disk drive 2 and host apparatus 3. The disk drive 2 includes a controller 21, motor 22, optical head 23, and signal processor 24.

A recording process in which the disk drive 2 records data supplied from the host apparatus 3 on the optical disk 1 will be explained first. Data recording is executed based on a write command sent from the host apparatus 3. This write command will be described later. The motor 22 rotates the optical disk 1 at a predetermined speed under the control of the controller 21. Data supplied from the host apparatus 3 to follow the write command is supplied to the signal processor 24. The signal processor 24 modulates data sent from the host apparatus 3 to generate recording data. The optical head 23 includes a semiconductor laser (not shown), which emits a recording laser beam that reflects the recording data. The optical head 23 undergoes tracking control and focus control by the controller 21. The recording laser beam emitted by the semiconductor laser is focused at a predetermined position on the optical disk 1. As a result, the recording data is recorded at the predetermined position on the optical disk 1.

A reproduction process in which the disk drive 2 reproduces data recorded on the optical disk 1 and outputs the reproduction data to the host apparatus 3 will be explained below. The motor 22 rotates the optical disk 1 at a predetermined speed under the control of the controller 21. The semiconductor laser included in the optical head 23 emits a reproduction laser beam. Also, the optical head 23 undergoes tracking control and focus control by the controller 21. As a result, the reproduction laser beam emitted by the semiconductor laser is focused at a predetermined position on the optical disk 1. Reflected light of the reproduction laser beam focused on the optical disk reflects data recorded on the optical disk. The reflected light is detected by a photodetector (not shown) included in the optical head 23. The detection result of the reflected light detected by the photodetector is supplied to the signal processor 24 as a reflected light detection signal. The signal processor 24 generates data recorded on the optical disk 1 on the basis of the reflected light detection signal. Furthermore, the signal processor 24 demodulates the generated data to generate reproduction data, and outputs the reproduction data to the host apparatus 3.

Figure 7:
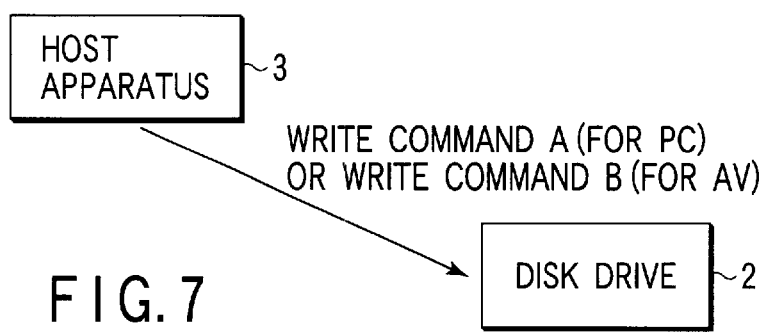
FIG. 7 shows the recording process of PC data and AV data while discriminating them depending on write commands.

Recording of PC and AV data will be described with reference to FIG. 7

Recording of AV data and that of normal data (e.g., PC data) are distinguished by an interface command sent from the host apparatus 3. That is, when the host apparatus 3 sends write command A (PC data recording command), the disk drive 2 (the optical head 23 of the disk drive 2) records bit 1 (first identification information) as the integrity flag in the integrity flag area of a sector field as a recording destination upon data recording. At this time, bit 1 is recorded as the integrity flag not only in the sector field as the recording destination but also in all sector fields included in an ECC block which includes the sector field as the recording destination. That is, write command A instructs the high-integrity recording mode.

When the host apparatus 3 sends write command B (AV data recording command), the disk drive 2 (the optical head 23 of the disk drive 2) records bit 0 (second identification information) as the integrity flag in the integrity flag area of a sector field as a recording destination upon data recording. At this time, bit 0 is recorded as the integrity flag not only in the sector field as the recording destination but also in all sector fields included in an ECC block which includes the sector field as the recording destination. That is, write command B instructs the low-integrity recording mode.

Figure 8:
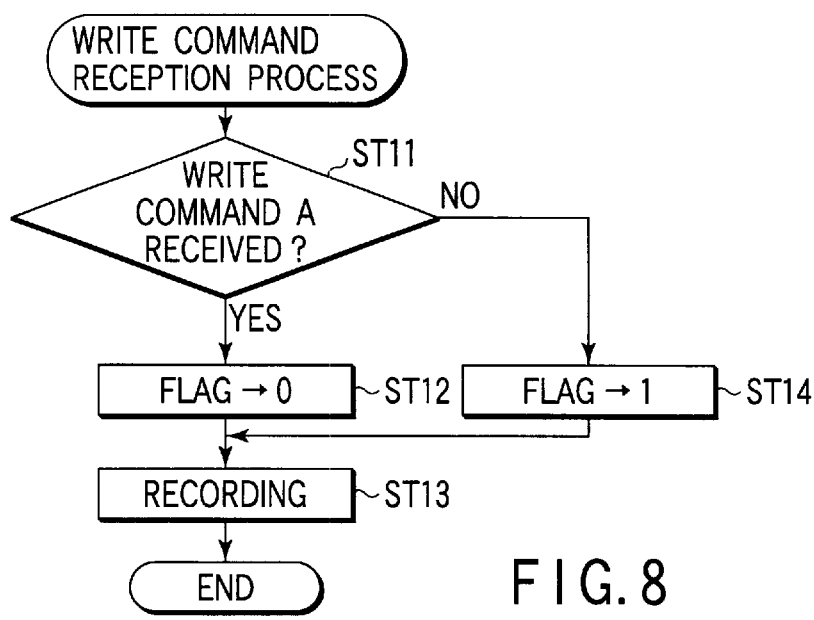
FIG. 8 is a flow chart showing the process for recording an integrity flag based on a write command.

FIG. 8 is a flow chart showing recording of the integrity flag based on the write command.

Upon recording data with the first integrity level on the optical disk, the host apparatus 3 issues write command A. The disk drive 2 receives this write command A (YES in ST11), and bit 1 is recorded as the integrity flag in the integrity flag area of a sector field as a recording destination (ST14). After that, actual recording starts (ST13).

On the other hand, upon recording data with the second integrity level on the optical disk, the host apparatus 3 issues write command B. Upon receiving write command B (NO in ST11), the disk drive 2 records bit 0 as the integrity flag in the integrity flag area of a sector field as a recording destination (ST12). After that, actual recording starts (ST13).

Figure 9:
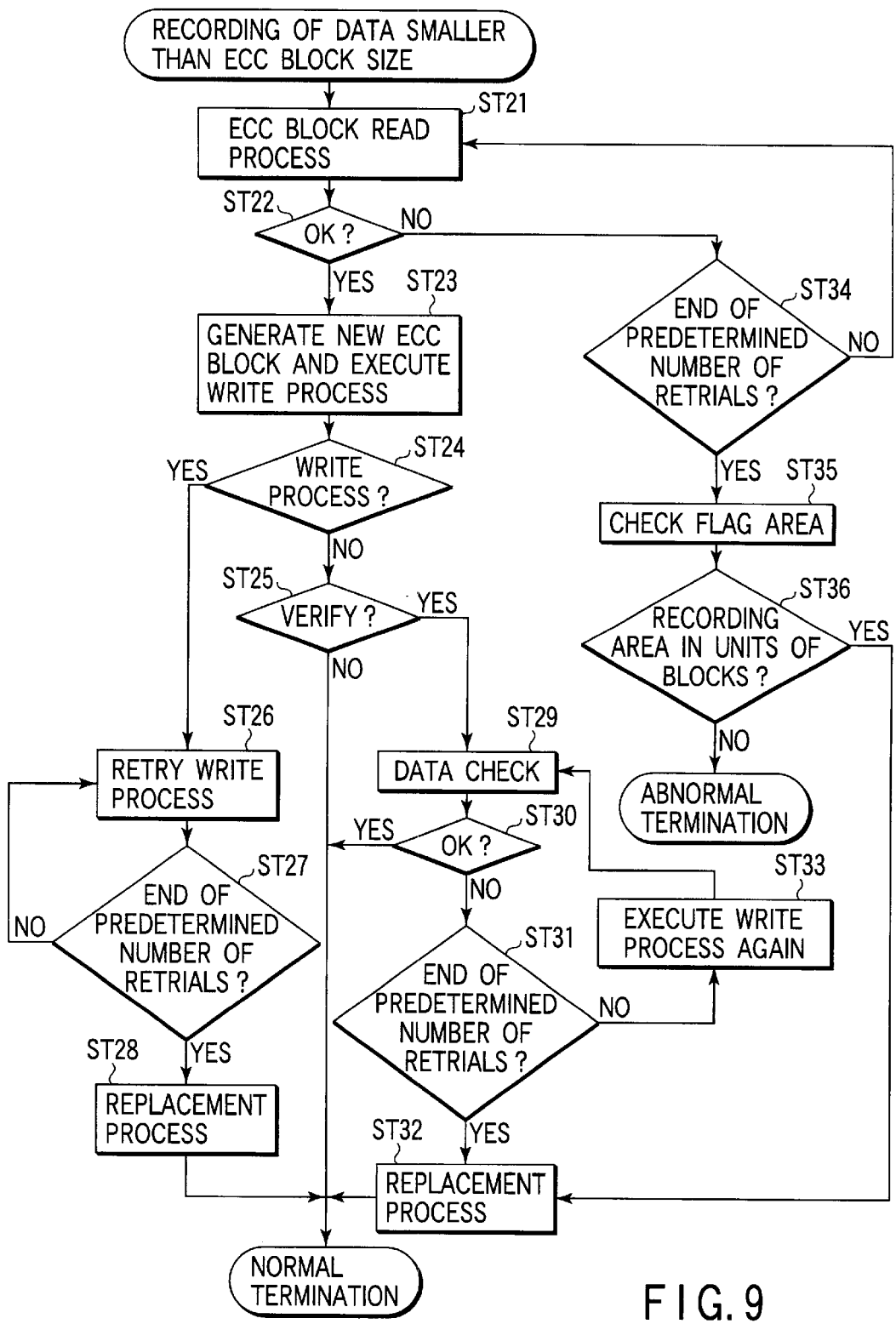
FIG. 9 is a flow chart showing details of recording in the flow chart shown in FIG. 8, and especially, recording of data smaller than an ECC block size.

FIG. 9 is a flow chart showing details of recording in the flow chart shown in FIG. 8, and especially, recording of data which is smaller than an ECC block size.

An ECC block including a target sector field as a recording destination is read (ST21). If this ECC block is read normally (YES in ST22), target data patches a portion of the read ECC block data, which corresponds to the target sector field, and the ECC block is re-arranged and recorded in the original ECC block (ST23). If no abnormality is found in recording (NO in ST24), this means completion of read-modify-write. After that, if verify is required (YES in ST25), verify starts.

In verify, the recorded data is checked (ST29). If it is confirmed that the data is recorded normally (YES in ST30), a series of recording operations normally terminate. If it is not confirmed that the data is recorded normally (NO in ST30), recording repeats itself a predetermined number of retrial times (ST31, ST33). As a result of the retried recording, if it is confirmed that the data is recorded normally (YES in ST30), a series of recording operations normally terminate. If it is not confirmed even after the retried recording that the data is recorded normally (NO in ST30, YES in ST31), the control starts a replacement process (ST32). That is, recording using a spare area set in advance on the disk as a recording destination is executed under the control of the controller 21 of the disk drive 2.

If any abnormality is found upon recording in step ST23 (YES in ST24), recording repeats itself a predetermined number of retrial times (ST26, ST27). If any abnormality is found in recording even after the recording is retried a predetermined number of times (YES in ST27), the control starts a replacement process (ST28). That is, recording using a spare area set in advance on the disk as a recording destination is executed under the control of the controller 21 of the disk drive 2.

Upon reading an ECC block that includes the target sector field as the recording destination (ST21), if this ECC block cannot be read normally (NO in ST22), that is, if error correction cannot be made using the ECC included in this ECC block, a retrial is made a predetermined number of times. If the ECC block cannot be read normally even after retrials (YES in ST34), the integrity flag of the integrity flag area of the recording destination is reproduced (ST35). This integrity flag is included in the data ID, and can be independently read out even when error correction using the ECC1 and ECC2 is disabled. Furthermore, since this integrity flag is included in the data ID, data integrity can be checked by the IED.

If bit 1 is reproduced as the integrity flag, it is determined that data recorded in the sector field which includes this integrity flag must have high integrity (NO in ST36). In this case, the control cannot start a replacement process, and this flow terminates abnormally. By contrast, if bit 0 is reproduced as the integrity flag, it is determined that data recorded in the sector field which includes this integrity flag can have low integrity (YES in ST36). In this case, the control starts replacement process # (ST32). That is, recording using a spare area set in advance on the disk as a recording destination is executed under the control of the controller 21 of the disk drive 2.

Replacement process # will be explained below. In this replacement process #, desired data is recorded in a target sector included in a replacement block, and dummy data is recorded in sectors other than the target sector included in the replacement block. The dummy data is, for example, partially corrected data or padding data of 0b for all bits.

A process executed when different types of identification information are reproduced from the integrity flag areas of a predetermined number of sector fields that belong to an identical ECC block will be explained below. Normally, an identical integrity flag is recorded in the integrity flag areas of a predetermined number of sector fields that belong to an identical ECC block. However, the flag cannot often be normally read out due to some factors, and different identification flags may be reproduced from the integrity flag areas of a predetermined number of sector fields that belong to an identical ECC block.

In such case, the signal processor 24 of the disk drive 2 checks the likelihood of identification flags. The likelihood is determined by majority. That is, a type corresponding to the larger number of readout identification flags of those read out from the integrity flag areas of a predetermined number of sector fields that belong to an identical ECC block is determined to be a correct identification flag.

The effects of the present invention will be summarized below.

Conventionally, when PC data is overwritten on AV data, the error rate increases upon read-modify-write due to the absence of defect management. That is, ECC block data cannot be read out upon read-modify-write, that ECC block consequently cannot undergo a replacement process, and read-modify-write terminates abnormally.

In the present invention, in order to solve such problem, an identification information area which can be independently reproduced irrespective of error correction using an error correction code is assured on each sector field on the disk. This identification information area stores one of first identification information which indicates that data is recorded with a first integrity level, and second identification information which indicates that data is recorded with a second integrity level lower than the first integrity level.

In this way, even when an ECC block cannot be normally reproduced upon read-modify-write, if only this identification area can be reproduced, at least whether the recorded data has the first integrity level (high-integrity data) or second integrity level (low-integrity data) can be detected. If it is determined that the recorded data is data with the second integrity level, this ECC block is replaced by a replacement block in a spare area assured in advance on the disk, thus solving the aforementioned problem in read-modify-write.

According to the present invention, the following information recording medium, information recording apparatus, information recording method, information reproduction apparatus, and information reproduction method are provided:

(1) an information recording medium which can reduce the error rate upon read-modify-write when data is overwritten in units of sector fields on data recorded in units of ECC block data;

(2) an information recording apparatus and method which can reduce the error rate upon read-modify-write when data is overwritten in units of sector fields on data recorded in units of ECC block data; and (3) an information reproduction apparatus and method which can reduce the error rate upon read-modify-write when data is overwritten in units of sector fields on data recorded in units of ECC block data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium which has a plurality of sector fields that record data, and in which a block is defined by a set of a predetermined number of sector fields, wherein each sector field has an identification information area for storing one of first identification information indicating that data is recorded with a first integrity level, and second identification information indicating that data is recorded with a second integrity level lower than the first integrity level.

2. A medium according to claim 1, wherein the identification information areas of sector fields included in one block consistently store one of the first identification information and second identification information.

3. A medium according to claim 1, wherein the identification information area can be independently reproduced irrespective of an error correction process using an error correction code included in ECC block data recorded in the block.

4. A medium according to claim 1, wherein the sector field includes a recording field which records user data, and a header field which records address data, the recording field includes the identification information area, when ECC block data is recorded in the block, a predetermined number of sector data generated based on the ECC block data are recorded in a predetermined number of recording fields included in the block to have one-to-one correspondence therebetween, the ECC block data includes block data, a first error correction code, and a second error correction code, the block data includes predetermined data which are arranged along a first direction and a second direction perpendicular to the first direction, the first error correction code corrects the predetermined data arranged along the first direction, the second error correction code corrects the predetermined data arranged along the second direction, the sector data includes a part of the block data broken up into the predetermined number of data, a part of the first error correction code corresponding to the part of the block data, and a part of the second error correction code broken up into the predetermined number of data, and the identification information area can be independently reproduced irrespective of an error correction process using the first and second error correction codes.

5. An information recording apparatus for recording information on an information recording medium which has a plurality of sector fields that record data and respectively have identification information areas, and in which a block is defined by a set of a predetermined number of sector fields, comprising:

recording means for recording, in the identification information area, first identification information indicating that data is recorded with a first integrity level when desired information is recorded with the first integrity level on said information recording medium, and recording, in the identification information area, second identification information indicating that data is recorded with a second integrity level when desired information is recorded with the second integrity level on said information recording medium.

6. An apparatus according to claim 5, further comprising recording means for, when desired information is recorded with the first integrity level in a predetermined block, consistently recording, in the identification information areas of sector fields included in the predetermined block, the first identification information indicating that data is recorded with the first integrity level, and for, when desired information is recorded with the second integrity level in a predetermined block, consistently recording, in the identification information areas of sector fields included in the predetermined block, the second identification information indicating that data is recorded with the second integrity level.

7. An apparatus according to claim 6, further comprising recording means for, when desired information is to be recorded in a predetermined sector field included in a predetermined block with the first or second integrity level, determining one of the first and second integrity levels as an integrity level of actual recording on the basis of the relationship between the integrity level of the information to be recorded, and the integrity level indicated by identification information reproduced from the identification information areas of sector fields included in the predetermined block as a recording destination, consistently recording the first identification information in the identification information areas of the sector fields included in the predetermined block when the integrity level of actual recording is determined to be the first integrity level, and consistently recording the second identification information in the identification information areas of the sector fields included in the predetermined block when the integrity level of actual recording is determined to be the second integrity level.

8. An apparatus according to claim 6, further comprising:

first sector-unit recording means for, when a predetermined block can undergo error correction using an error correction code included therein, and desired information is to be recorded in a predetermined sector field included in the predetermined block with the first or second integrity level, determining one of the first and second integrity levels as an integrity level of actual recording on the basis of the relationship between the integrity level of the information to be recorded, and the integrity level indicated by identification information reproduced from the identification information areas of sector fields included in the predetermined block as a recording destination, consistently recording the first identification information in the identification information areas of the sector fields included in the predetermined block when the integrity level of actual recording is determined to be the first integrity level, and consistently recording the second identification information in the identification information areas of the sector fields included in the predetermined block when the integrity level of actual recording is determined to be the second integrity level;

second sector-unit recording means for, when a predetermined block cannot undergo error correction using an error correction code included therein, the second identification information is reproduced from the identification information areas of sector fields included in the predetermined block, and desired information is to be recorded in a predetermined sector field included in the predetermined block with the first integrity level, consistently recording the first identification information in the identification information areas of the sector fields included in the predetermined block, recording the desired information in the predetermined sector field included in the predetermined block, and recording dummy information in the sector fields other than the predetermined sector field included in the predetermined block; and third sector-unit recording means for, when a predetermined block cannot undergo error correction using an error correction code included therein, the second identification information is reproduced from the identification information areas of sector fields included in the predetermined block, and desired information is to be recorded in a predetermined sector field included in the predetermined block with the second integrity level, consistently recording the second identification information in the identification information areas of the sector fields included in the predetermined block, recording the desired information in the predetermined sector field included in the predetermined block, and recording dummy information in the sector fields other than the predetermined sector field included in the predetermined block.

9. An apparatus according to claim 8, wherein the dummy information is partially corrected data or padding data of 0b for all bits.

10. An apparatus according to claim 6, further comprising determination means for, when different kinds of identification information are reproduced from the identification information areas of a predetermined number of sector fields which belong to an identical block, determining likelihood from those pieces of identification information.

11. An information recording method comprising:
   the step of, when desired information is recorded with a first integrity level in an information recording medium which has a plurality of sector fields that record data and respectively have identification information areas, and in which a block is defined by a set of a predetermined number of sector fields, recording data in each identification information area with the first integrity level; and
   the step of, when desired information is recorded with a second integrity level in the information recording medium, recording data in each identification information area with the second integrity level.

12. A method according to claim 11, further comprising the steps of:
   the step of, when desired information is recorded with the first integrity level in a predetermined block of the information recording medium, consistently recording data in the identification information areas of sector fields included in the predetermined block with the first integrity level; and
   the step of, when desired information is recorded with the second integrity level in a predetermined block of the information recording medium, consistently recording data in the identification information areas of sector fields included in the predetermined block with the second integrity level.

13. A method according to claim 12, further comprising:
   the step of, when desired information is to be recorded in a predetermined sector field included in a predetermined block with the first or second integrity level, determining one of the first and second integrity levels as an integrity level of actual recording on the basis of the relationship between the integrity level of the information to be recorded, and the integrity level indicated by identification information reproduced from the identification information areas of sector fields included in the predetermined block as a recording destination, consistently recording the first identification information in the identification information areas of the sector fields included in the predetermined block when the integrity level of actual recording is determined to be the first integrity level, and consistently recording the second identification information in the identification information areas of the sector fields included in the predetermined block when the integrity level of actual recording is determined to be the second integrity level.

14. A method according to claim 12, further comprising:
   the step of, when a predetermined block can undergo error correction using an error correction code included therein, and desired information is to be recorded in a predetermined sector field included in the predetermined block with the first or second integrity level, determining one of the first and second integrity levels as an integrity level of actual recording on the basis of the relationship between the integrity level of the information to be recorded, and the integrity level indicated by identification information reproduced from the identification information areas of sector fields included in the predetermined block as a recording destination, consistently recording the first identification information in the identification information areas of the sector fields included in the predetermined block when the integrity level of actual recording is determined to be the first integrity level, and consistently recording the second identification information in the identification information areas of the sector fields included in the predetermined block when the integrity level of actual recording is determined to be the second integrity level;
   the step of, when a predetermined block cannot undergo error correction using an error correction code included therein, the second identification information is reproduced from the identification information areas of sector fields included in the predetermined block, and desired information is to be recorded in a predetermined sector field included in the predetermined block with the first integrity level, consistently recording the first identification information in the identification information areas of the sector fields included in the predetermined block, recording the desired information in the predetermined sector field included in the predetermined block, and recording dummy in formation in the sector fields other than the predetermined sector field included in the predetermined block; and
   the step of, when a predetermined block cannot undergo error correction using an error correction code included therein, the second identification information is reproduced from the identification information areas of sector fields included in the predetermined block, and desired information is to be recorded in a predetermined sector field included in the predetermined block with the second integrity level, consistently recording the second identification information in the identification information areas of the sector fields included in the predetermined block, recording the desired information in the predetermined sector field included in the predetermined block, and recording dummy information in the sector fields other than the predetermined sector field included in the predetermined block.

15. A method according to claim 14, wherein the dummy information is partially corrected data or padding data of 0b for all bits.

16. A method according to claim 12, further comprising the step of, when different kinds of identification information are reproduced from the identification information areas of a predetermined number of sector fields which belong to an identical block, determining likelihood from those pieces of identification information.

17. An information reproduction apparatus for reproducing information from an information recording medium which has a plurality of sector fields that record data, and in which each sector field has an identification information area that records one of first identification information indicating that data is recorded with a first integrity level, and second identification information indicating that data is recorded with a second integrity level lower than the first integrity level, and a block is defined by a set of a predetermined number of sector fields, comprising:
   reproduction means for acquiring information that pertains to integrity by reproducing the first identification information or second identification information from the identification information area.

18. An information reproduction method for reproducing information from an information recording medium which has a plurality of sector fields that record data, and in which each sector field has an identification information area that records one of first identification information indicating that data is recorded with a first integrity level, and second identification information indicating that data is recorded with a second integrity level lower than the first integrity level, and a block is defined by a set of a predetermined number of sector fields, comprising:

the step of acquiring information that pertains to integrity by reproducing the first identification information or second identification information from the identification information area.

* * * * *